Oct. 1, 1968  H. L. RATLIFF, JR  3,403,576
SINGLE LEVER CONTROL ASSEMBLY
Filed Sept. 9, 1966

INVENTOR
Harvey L. Ratliff Jr.

3,403,576
SINGLE LEVER CONTROL ASSEMBLY
Harvey L. Ratliff, Jr., Oxon Hill, Md., assignor to
Jetru, Inc., Amarillo, Tex.
Continuation-in-part of application Ser. No. 394,698,
Sept. 8, 1964. This application Sept. 9, 1966, Ser.
No. 578,342
5 Claims. (Cl. 74—471)

ABSTRACT OF THE DISCLOSURE

There is disclosed a single lever control assembly which enables many direct and mechanical controls from one lever. Axial displacement of the lever can directly and mechanically control one mechanism such as the throttle of a fixed wing aircraft. Rotational movement of the lever can directly and mechanically control a second mechanism such as the ailerons of a fixed wing aircraft. Lateral displacement of the lever about a pivot point in a first, say horizontal, plane can directly and mechanically control a third mechanism. Lateral displacement of the lever about the pivot point in a second, say vertical, plane can directly and mechanically control a fourth mechanism such as the elevators of a fixed wing aircraft.

---

This is a continuation-in-part of my copending prior application Ser. No. 394,698, filed Sept. 8, 1964, now abandoned.

The present invention relates generally to single lever control assemblies and more particularly improved cross coupling mechanisms embodied therewith.

The primary object of the present invention is to teach an improved mechanism for controlling four independent actuators mechanically and at least one other independent actuator electrically from a single lever, for example, to control yaw, pitch, roll and throttle mechanically and the flaps electrically from a single lever that could be operated with one hand.

In the contemplated form of the invention the force exerted by lateral displacement of the lever in a first plane (approximately horizontally) is exerted directly at the yaw control surface (i.e. the rudder); the force exerted by lateral displacement of the lever in a second plane which is perpendicular to the first plane (approximately vertically) is exerted directly at the pitch control surface (i.e. the elevator); the force exerted by rotation of the lever is exerted directly at the roll control surfaces (i.e. the ailerons); the force exerted by axial displacement is exerted directly at the throttle control; and the electronic signals from a switch are transmitted to the flap actuator.

Figure 1:
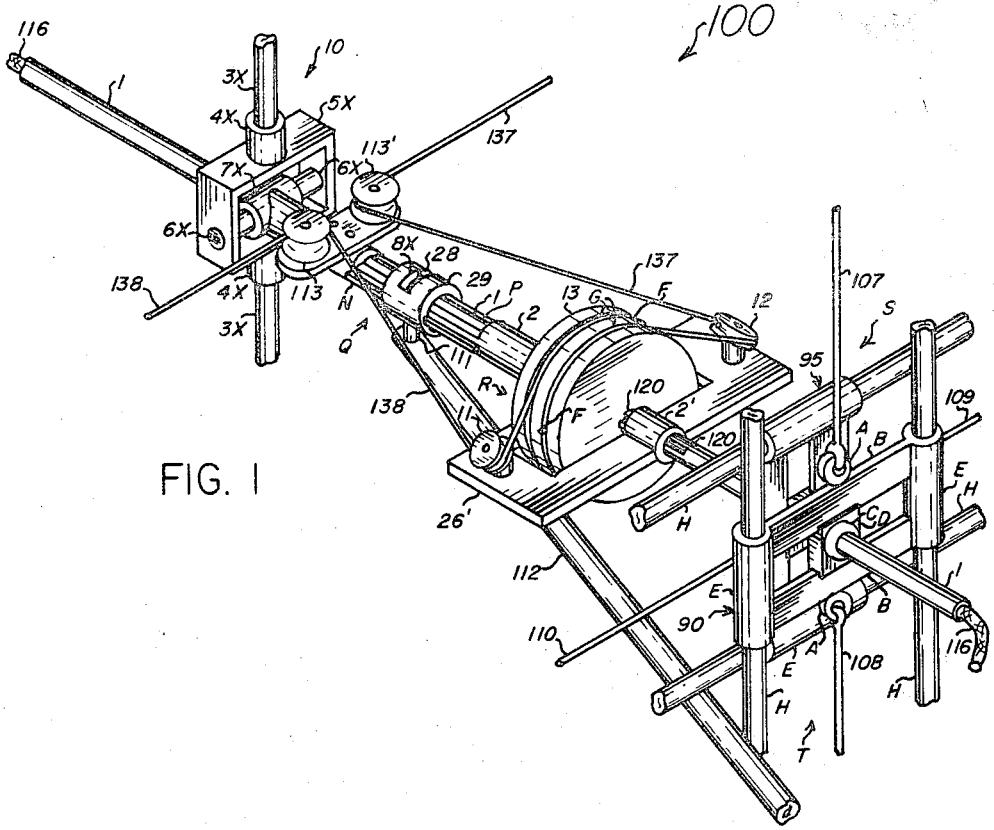

Other objects and advantages of my invention will become more apparent from a study of the following description taken with the accompanying drawings wherein:

FIG. 1 is a perspective view of a complete embodiment of the present invention.

Figure 2:
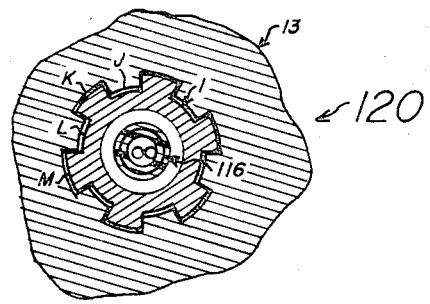

FIG. 2 is a partial sectional view showing lever 1 within sheave 13, to show actuator cross coupling mechanism 120.

Referring more particularly to the drawings reference is made to FIG. 1 showing control assembly 100. In this form of the invention joint 10 is different from joint 10 of the parent case however the joint of the parent case could readily be used herewith. As shown in FIG. 1, rods 3X are rigidly secured to the housing, which can be any well known housing or take any desired form, at one end of each and rotatably inserted in sleeves 4X at the other end of each. Sleeves 4X are rigidly secured to ring 5X so that 5X may be laterally displaced in the first plane (approximately horizontally) about the axis of 3X. Rods 6X are rigidly secured to ring 5X at one end of each and rotatably inserted into sleeves 7X at the other end of each. Sleeves 7X are rigidly secured to sleeve 2 so that sleeve 2 may be laterally displaced in the first plane with ring 5 and also laterally displaced in the second plane, which is perpendicular to the first plane, about the axis of 6X.

Lever 1 is inserted in sleeve 2 so that it is rotatable and axially displaceable therein; therefore, lever 1 is displaceable in the first plane, displaceable in the second plane, rotatable, and axially displaceable when inserted in sleeve 2.

Stud 28 is rigidly secured to lever 1 so that it moves therewith. Stud 28 extends up through opening 8X of sleeve 29 whereby sleeve 29 moves axially with lever 1. Sleeve 29 is keyed to sleeve 2 with key N whereby sleeve 29 does not rotate with lever 1. Sleeve 29 is placed very close to joint 10 whereby sleeve 29 is laterally displaced by 1 to only a negligible extent. Many of the distances of the drawing are exaggerated for the purpose of illustration. Stud 111 is rigidly secured to sleeve 29 at one end and rotatably secured in rod 112 at the other whereby substantially all the axial displacement force of lever 1 is transmitted to throttle actuator rod 112 and substantially none of the lateral displacement forces are transmitted by throttle actuator 112. Of course, key N prevents any rotation force from being transmitted by 112. Opening P allows 28 to move with 1.

Cross coupler 120 is a spline mechanism which directly transmits the rotational force exerted by lever 1 while transmitting none of the axial displacement force exerted by lever 1 and comprises teeth M and recesses L over a displacement distance along lever 1 respectively meshed with recesses K and teeth J within sheave 13 whereby lever 1 may freely be moved axially without effecting sheave 13 while mechanically transmitting the rotational force exerted upon 1 to sheave 13.

Ring 26' surrounds sheave 13 and rigidly secures sleeve 2', sheave 11 and sheave 12 to sleeve 2. Neither sleeve 2 nor sleeve 2' is splined to lever 1 whereby lever 1 may freely rotate therein and, of course be freely axially displaced therein. Grooves G are provided in sheave 13, cables 137 and 138 are respectively secured within grooves G by pins F and respectively threaded within grooves G about sheave 13, respectively about sheaves 12 and 11, respectively about sheaves 113' and 113 and go directly to the ailerons for direct control thereof. Sheaves 113' and 113 are supported as close as possible to joint 10 whereby lateral displacement of lever 1 has only a negligible effect upon the ailerons or an equivalent control.

There are two lateral displacement cross couplers: 95 (for first plane actuation) and 90 for second plane actuation. Each of 90 and 95 are identical except every element of 90 is rotated 90° from the corresponding element of 95. Each of 90 and 95 comprise two laterally spaced rods H which are each rigidly supported by the housing; two sleeves E which are slidably supported by rods H; two cross bars B which are laterally spaced and respectively perpendicular to the corresponding respective rods H, are parallel to each other, and are rigidly secured to the respective two sleeves E whereby unit 95 can only move in a first (approximately horizontal) plane and unit 90 can only move in the second (approximately vertical) plane; runner D which is slidably mounted between cross bars B whereby lever 1 may be moved in the first plane without effecting 90 and in the second plane without effecting 95, and provides a ball socket for ball C; ball C which is slidably fitted into the socket of runner D and provides a sleeve for supporting lever 1 whereby lever 1 may universally move within ball C and slidably move within ball C to move units 95 and 90 anywhere within the limits allowed by cross bars B; and pins A; whereby unit 95 is directly mechanically responsive to first plane displacement and not responsive to second plane displacement, axial displacement or rotation of lever 1, and whereby unit 90 is directly mechanically responsive to second plane lateral displacement and not responsive to first plane lateral displacement, axial displacement or rotation of lever 1.

Cables 109 and 110 directly connect unit 95 to the rudder whereby the force output in the first plane lateral direction exerted by lever 1 is directly connected to the rudder for direct control thereof. Cables 107 and 108 directly connect unit 90 to the elevator whereby the force output in the second plane lateral direction exerted by lever 1 is directly connected to the elevator for direct control thereof.

In order to provide the greatest leverage for the operator of lever 1, throttle control assembly Q (consisting of 28, 29 etc.) is placed as close as possible to joint 10; roll control assembly R (consisting of 11, 12, 13 etc.) is placed as close as possible to Q; yaw control assembly S is placed as close as possible to R; and pitch control assembly T (consisting of 90 etc.) is placed as close as possible to S.

While the invention has been disclosed and described in some detail in the drawings and foregoing description, they are to be considered as illustrative and not restrictive in character, as other modifications may readily suggest themselves to persons skilled in the art within the broad scope of the invention, reference being had to the appended claims.

I claim:
1. A single lever control assembly for multiple controlled actuations comprising:
   a supported joint allowing lateral displacement in a first plane and lateral displacement in a second plane which is perpendicular to said first plane;
   a sleeve means supported by said joint;
   a lever handle control means extending through said sleeve means and mounted so as to be universally and axially movable therein;
   a first and second actuator means mechanically coupled to said lever-handle control means along said first and second planes respectively whereby displacement in said first direction of said control means directly and mechanically controls said first actuator means and displacement in said second plane of said control means directly and mechanically controls said second actuator means, said first actuator means comprising two laterally spaced and parallel rods rigidly supported along lines in said first plane; two sleeve means respectively slidably mounted upon said rods; two laterally spaced and parallel cross bars rigidly secured to and between said two sleeve means along lines in said second plane; a runner means slidably mounted by and between said cross bars whereby said runner may move in said second plane without moving said first actuator means; universal and slidable joint means mounted within said runner means; said lever-handle control means being universally mounted within said universal and slidable joint means whereby rotation, axial displacement and lateral displacement in said second plane of said control means has no effect upon said first actuator means but lateral displacement in said first plane of said control mechanically and directly moves said first actuator means;
   a third actuator means mechanically coupled to said lever handle control means whereby rotation of said control means directly and mechanically controls said third actuator means; and
   a fourth actuator means mechanically coupled to said lever-handle control means whereby axial displacement of said control means directly and mechanically controls said fourth actuator means.

2. The assembly of claim 1 wherein said second actuator means comprises:
   each of the elements of the first actuator means, each respective said element being rotated 90° from the respective corresponding element of said first actuator means whereby rotation, axial displacement and lateral displacement in said first plane of said control means has no effect upon said second actuator means but lateral displacement in said second plane of said control means mechanically and directly moves said second actuator means.

3. The assembly of claim 2 wherein said third actuator means comprises:
   a large sheave means having two grooves therein for supporting transmitting members; spline means directly and mechanically coupling said large sheave means to said control means whereby rotation of said control means is directly and mechanically transmitted to said large sheave means for direct actuation therefrom and axial displacement, lateral displacement in said first plane or lateral displacement in said second plane have no effect upon said large sheave means providing no actuation therefrom; means of directing the direct rotational actuation from points close to said joint whereby lateral displacement of said control means has negligible effect therefrom.

4. The assembly of claim 3 wherein said fourth actuator means comprises:
   a stud means rigidly secured to said control means near said joint and extending through an opening in said joint sleeve means whereby said stud rotates and moves axially with said control means but moves only negligibly in lateral planes with said control means; a stud sleeve means keyed to said joint sleeve means whereby said stud sleeve means can not rotate with said control means, provided with an opening whereby said stud means can freely rotate with said control means without effecting said stud sleeve means, and surrounding said joint sleeve means whereby said stud sleeve means can freely move axially with said stud means for direct actuation from said stud sleeve means.

5. A single lever control assembly for multiple controlled actuations comprising:
   a supported joint allowing lateral displacement in a first plane and lateral displacement in a second plane which is perpendicular to said first plane;
   a sleeve means supported by said joint;
   a lever-handle control means extending through said sleeve means and mounted so as to be universally and axially movable therein;
   a first and second actuator means mechanically coupled to said lever-handle control means along said first and second planes respectively whereby displacement in said first direction of said control means directly and mechanically controls said first actuator means and displacement in said second plans of said control means directly and mechanically controls said second actuator means;
   a third actuator means mechanically coupled to said lever-handle control means whereby rotation of said control means directly and mechanically controls said third actuator means, said third actuator comprising a large sheave means having two grooves therein for supporting transmitting members; spline means directly and mechanically coupling said large sheave means to said control means whereby rotation of said control means is directly and mechanically transmitted to said large sheave means for direct actuation therefrom and axial displacement, lateral displacement in said first plane or lateral displacement in said second plane have no effect upon said large sheave means providing no actuation therefrom; means of directing the direct rotational actuation from points close to said joint whereby lateral displacement of said control means has a negligible effect therefrom;

a fourth actuator means mechanically coupled to said lever-handle control means whereby axial displacement of said control means directly and mechanically controls said fourth actuator means.

References Cited

UNITED STATES PATENTS 3,266,523  8/1966  Stevens _____ 74—471 X

MILTON KAUFMAN, *Primary Examiner.*